US006912258B2

(12) United States Patent
Birru (10) Patent No.: US 6,912,258 B2
(45) Date of Patent: Jun. 28, 2005

(54) FREQUENCY-DOMAIN EQUALIZER FOR TERRESTRIAL DIGITAL TV RECEPTION

(75) Inventor: Dagnachew Birru, Yorktown Heights, NY (US)

(73) Assignee: Koninklijke Philips Electtronics N.V., Eindhoven (NL)

(*) Notice: Subject to any disclaimer, the term of this patent is extended or adjusted under 35 U.S.C. 154(b) by 807 days.

(21) Appl. No.: 09/840,200

(22) Filed: Apr. 23, 2001

(65) Prior Publication Data

US 2002/0037058 A1 Mar. 28, 2002

Related U.S. Application Data

(60) Provisional application No. 60/217,143, filed on Jul. 7, 2000.

(51) Int. Cl.[7] .............................. H03D 1/00; H04L 27/06

(52) U.S. Cl. ....................... 375/340; 375/232; 375/324; 348/507

(58) Field of Search ................................ 375/340, 220, 375/344

(56) References Cited

U.S. PATENT DOCUMENTS

| 5,247,541 A | | 9/1993 | Nakai ........................... 375/14 |
| 5,293,402 A | | 3/1994 | Crespo et al. ................. 375/14 |
| 5,303,263 A | | 4/1994 | Shoji et al. .................... 375/11 |
| 5,779,047 A | | 7/1998 | Darrah ........................ 206/373 |
| 5,886,749 A | * | 3/1999 | Williams et al. ............. 348/614 |
| 6,239,657 B1 | * | 5/2001 | Bauer .......................... 330/149 |
| 6,252,902 B1 | * | 6/2001 | Simeon et al. ............... 375/222 |

(Continued)

FOREIGN PATENT DOCUMENTS

| EP | 0363551 B1 | 12/1994 |
| EP | 0967763 A1 | 12/1999 |
| WO | 0016526 A1 | 3/2000 |

OTHER PUBLICATIONS

Comparison of adaptive equalization methods for the ATSC and DVB–T digital television broadcast systems Eory, F. Motorola Inc., Chandler, AZ, USA; This paper appears in: Devices, Circuits and Systems, 2000. Proceedings of the 2000 Third IEEE Internation.*

DSP based OFDM demodulator and equalizer for professional DVB–T receivers Frescura, F.; Pielmeier, S.; Reali, G.; Baruffa, G.; Cacopardi, S.; Broadcasting, IEEE Transactions on, vol.: 45 , Issue: 3 , Sep. 1999 pp.: 323–332.*

"A Modified $\mu$–Weighted Normalized Frequency–Domain LMS Algorithms", by Harish S. Punjabi et al., pp. 232–236. XP000488549.

"Adaptive Frequency–Domain Equalization and Diversity Combining for Broadband Wireless Communications", by Martin V. Clark, pp. 409–413.

"Degradation of Multicarrier and Single Carrier Transmission with Frequency Domain Equalization due to Pilot–Aided Channel Estimation and Frequency Synchronization", by Andreas Czylwik, pp. 27–31.

*Primary Examiner*—Stephen Chin
*Assistant Examiner*—Harry Vartanian (57) ABSTRACT

A single integrated circuit multi-standard demodulator includes an adaptive inverse channel estimator for frequency domain equalization which employs a recursive least square cost function in estimating the inverse channel from the received signal and an error estimate. Utilizing a diagonal correlation matrix, the solution to may be determined utilizing fewer computational resources than required by conventional frequency domain equalizers, shifting from a computational intensive to memory intensive implementation. The memory requirement is fully satisfied by memory available within conventional OFDM decoders, and the necessary computational resources may be readily mapped to the resources available within such decoders, improving integrated circuit cost-effectiveness of the multi-standard demodulator.

18 Claims, 8 Drawing Sheets

U.S. PATENT DOCUMENTS

| | | |
|---|---|---|
| 6,327,314 B1 * 12/2001 | Cimini et al. | 375/340 |
| 6,351,500 B2 * 2/2002 | Kumar | 375/270 |
| 6,377,636 B1 * 4/2002 | Paulraj et al. | 375/346 |
| 6,400,781 B1 * 6/2002 | Vandendorpe et al. | 375/350 |
| 6,445,342 B1 * 9/2002 | Thomas et al. | 342/367 |
| 6,654,429 B1 * 11/2003 | Li | 375/316 |
| 6,714,587 B1 * 3/2004 | Van Houtum et al. | 375/220 |
| 6,744,821 B1 * 6/2004 | Van Acker et al. | 375/260 |
| 6,771,591 B1 * 8/2004 | Belotserkovsky et al. | 370/210 |

* cited by examiner

FREQUENCY-DOMAIN EQUALIZER FOR TERRESTRIAL DIGITAL TV RECEPTION

This application claims priority under 35 U.S.C. §119(e) to U.S. Provisional Patent Application No. 60/217,143 entitled "Frequency-Domain Equalizer for Terrestrial TV Reception" filed Jul. 7, 2000.

TECHNICAL FIELD OF THE INVENTION

The present invention is directed, in general, to equalization during decoding of wireless signals and, more specifically, to adaptive inverse channel estimation for frequency domain equalization in a manner suitable for implementation within a single integrated circuit multi-standard decoder.

BACKGROUND OF THE INVENTION

Two distinct standards for digital television (DTV) broadcasting modulation have been regionally adopted: the United States selected vestigial sideband modulation (VSB) with eight discrete amplitude levels (8-VSB) as promulgated by the Advanced Television Systems Committee (ATSC) digital television standard (ATSC Document A/53, Sep. 16, 1995) while Europe, Australia, and other regions selected Digital Video Broadcasting-Television (DVB-T) coded orthogonal frequency division multiplexing (COFDM) according to "Digital Video Broadcasting: Framing Structure, Channel Coding and Modulation for Digital Terrestrial Television," ETSI 300 744 (March 1997). These standards cover, respectively, single carrier and multi-carrier systems.

Figure 10A:
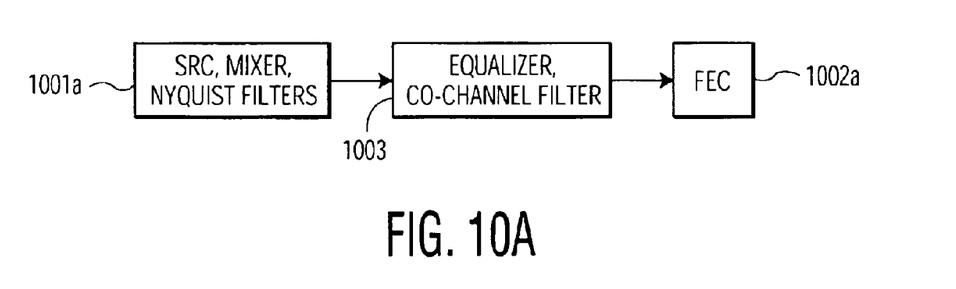
FIGS. 10A and 10B are block diagrams of vestigial sideband and orthogonal frequency division multiplexing decoders.
Figure 10B:
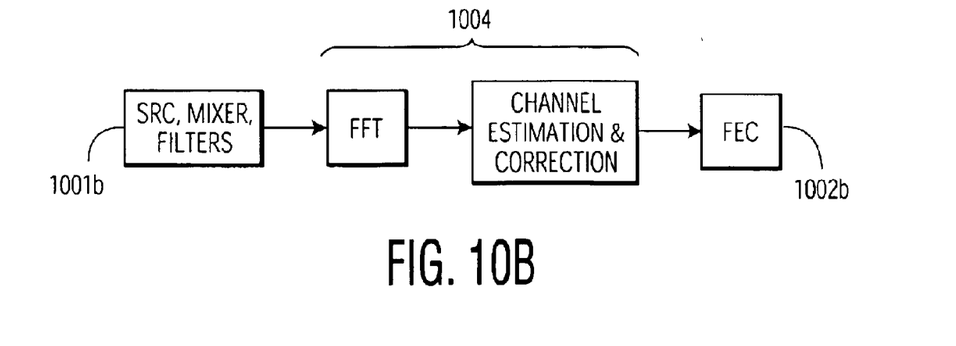

Comparative block diagrams for typical implementations of integrated circuit vestigial sideband and orthogonal frequency division multiplexing (OFDM) demodulators of the type employed for these two standards are illustrated respectively in FIGS. 10A and 10B. Most of the front end for both channel decoders 1000a and 1000b, which include sample rate conversion (SRC), mixing, and either filtering or Nyquist filtering units 1001a and 1001b, is similar. The forward error correction (FEC) units 1002a and 1002b was are also similar. Therefore, a single, multi-standard channel decoding integrated circuit may implement these portions in a combined manner utilizing direct hardware sharing techniques. However, most of the integrated circuit area employed for existing algorithms implementing the two standards is occupied by the equalizer 1003 in VSB and by the fast Fourier transform (FFT) and channel estimation and correction units 1004 in OFDM. Moreover, VSB is highly computational intensive, while OFDM is highly memory intensive. For these reasons, the current algorithms make it difficult to implement a combined channel decoder for both standards in a cost-effective manner.

Two possibilities exist for algorithmic-level unification of the VSB and OFDM standards, each requiring modification of the current algorithms implementing the respective standards. First, a time domain equalizer may be employed for OFDM, with the channel estimation and correction units for that standard being replaced with a time domain equalizer which is then mapped onto the current VSB equalizer hardware. However, qualitative observations indicate that such a technique will make effective use of the pilot carriers for the OFDM standard difficult, such that the technique may not result in performance comparable to the existing OFDM algorithm.

Figure 11:
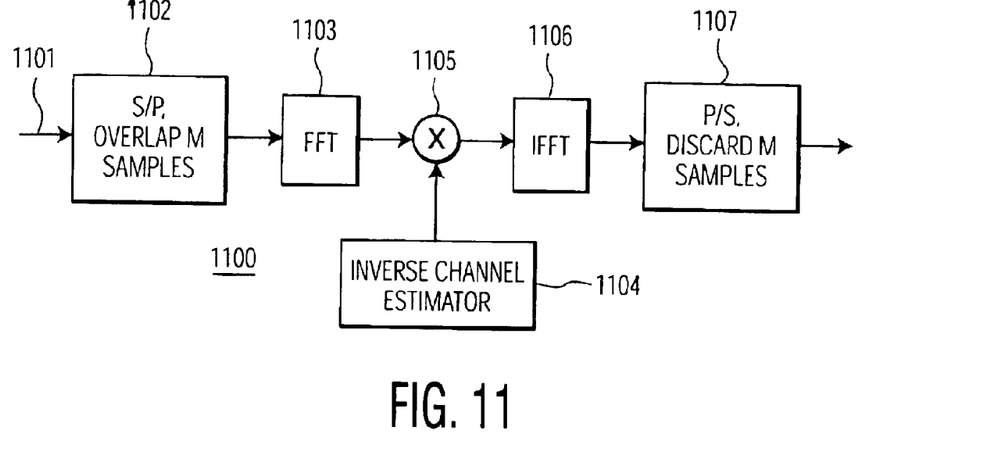
FIGS. 11 and 12 are high level block diagrams of a conventional frequency domain equalizer.

The second approach, employed by the present invention, is to utilize a frequency domain (FD) equalizer for VSB so that the equalizer portion may be mapped onto the OFDM hardware. A block diagram for a generalized frequency domain equalizer for single carrier systems is illustrated in FIG. 11. Signals received at the input 1101 to frequency domain equalizer 1100 are first processed by a serial-to-parallel converter (S/P) 1102 which overlaps M samples. A fast Fourier transform (FFT) unit 1103 then converts the digital data stream to the frequency domain, with the output of the FFT unit 1103 being multiplied by an inverse channel estimate from estimator unit 1104. The resulting equalized output of signal multiplier 1105 is then converted back to the time domain utilizing an inverse fast Fourier transform (IFFT) unit (1106) and converted to a serial signal utilizing parallel-to-serial (P/S) converter 1107, which discards M samples.

The primary differences between implementations of frequency domain equalizers of the type illustrated in FIG. 11 are parameters of the overlap-and-save FFT/IFFT operations (i.e., the size of the overlapping parameter M and the FFT/IFFT size N, where the IFFT operation can be combined with channel correction if the overlapping size is N−1) and the manner in which the inverse channel is estimated. The techniques proposed for estimating the inverse channel employ either higher-order statistical estimators or adaptive estimators, where the latter approach is employed by the present invention.

Figure 12:
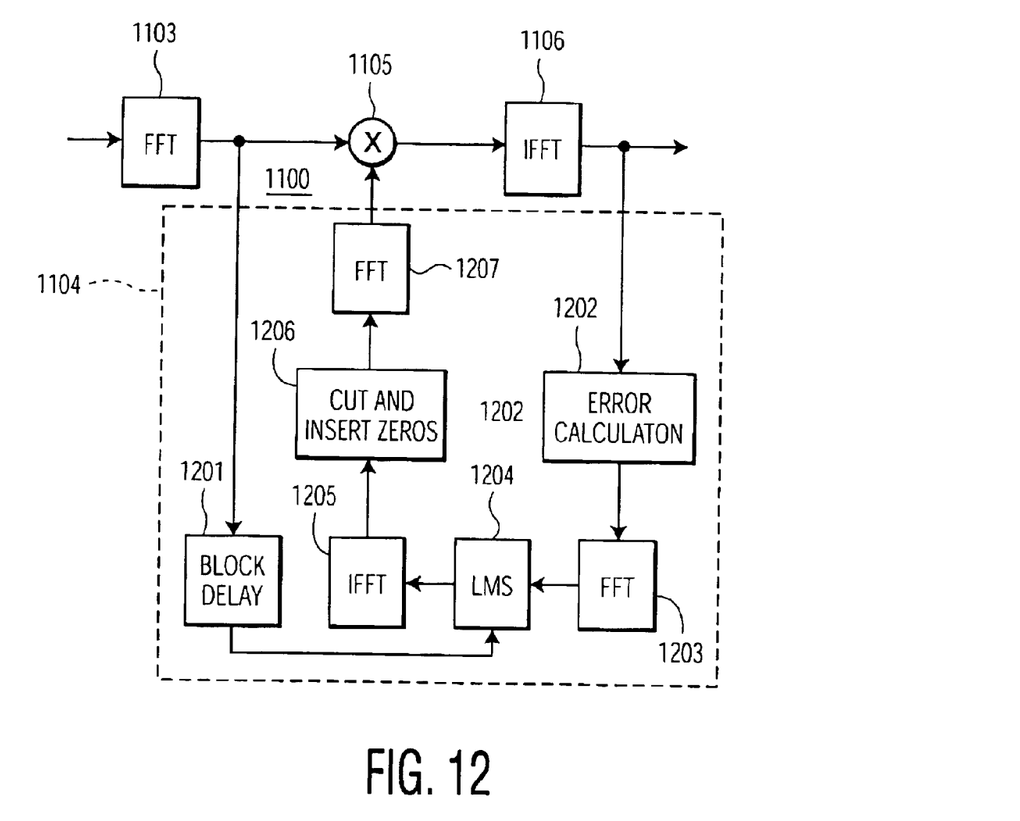

One typical adaptive frequency domain equalization technique, illustrated in FIG. 12, is basically derived from a frequency domain implementation of a finite impulse response (FIR) filter. Two FFT operations are inserted in the channel estimation loop so that the overall operation is identical to a block adaptive FIR filter. In the embodiment shown in FIG. 12, a block delay unit 1201 within inverse channel estimator 1104 receives the output of FFT unit 1103 while an error calculation unit 1202 receives the output of IFFT unit 1106. FFT unit 1203 performs an FFT operation of the error derived by error calculation unit and passes the frequency domain conversion of the error to a least mean square (LMS) adaptive transversal filter 1204 under the influence of the block delay from block delay unit 1201. The filtered result is converted back to the time domain by IFFT unit 1205 so that the inverse channel estimate may be produced by cut-and-insert-zeros unit 1206. The inverse channel estimate is then converted to the frequency domain by FFT unit 1207 and provided to signal multiplier 1105.

One drawback to this approach for adaptive inverse channel estimation lies in the poor tracking performance due to the loop delay introduced by the two FFT operations within the loop of the channel estimator 1104. Another disadvantage is the integrated circuit area cost associated with the two FFT operations.

There is, therefore, a need in the art for a frequency domain equalizer which reduces the number of FFT operations required during inverse channel estimation but enables the equalizer portion of a VSB channel decoder to be mapped onto OFDM hardware within a single integrated circuit multi-standard channel decoder.

SUMMARY OF THE INVENTION

To address the above-discussed deficiencies of the prior art, it is a primary object of the present invention to provide, for use in a single integrated circuit multi-standard demodulator, an adaptive inverse channel estimator for frequency domain equalization which employs a recursive least square cost function in estimating the inverse channel from the received signal and an error estimate. Utilizing a diagonal correlation matrix, the solution to may be determined utilizing fewer computational resources than required by conventional frequency domain equalizers, shifting from a computational intensive to memory intensive implementation. The memory requirement is fully satisfied by memory available within conventional OFDM decoders, and the necessary computational resources may be readily mapped to the resources available within such decoders, improving integrated circuit cost-effectiveness of the multi-standard demodulator.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
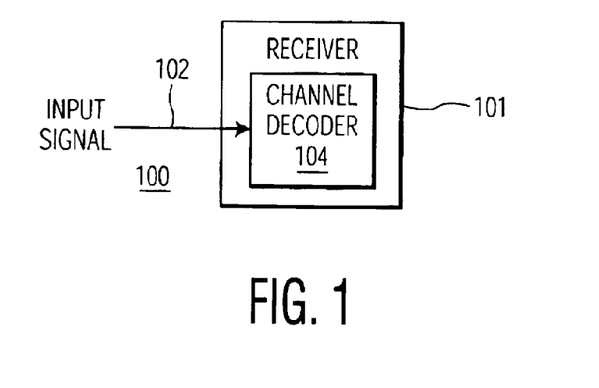
FIG. 1 depicts a system in which a single integrated circuit multi-standard channel decoder including a frequency domain equalizer employing adaptive inverse channel estimation is implemented according to one embodiment of the present invention.

FIG. 1 depicts a system in which a single integrated circuit multi-standard channel decoder including a frequency domain equalizer employing adaptive inverse channel estimation is implemented according to one embodiment of the present invention. System 100 includes a receiver 101, which in the exemplary embodiment is a digital television (DTV) receiver including a single integrated circuit multi-standard channel decoder 102 capable of demodulating digital television broadcast signals according to either the vestigial sideband (VSB) or coded orthogonal frequency division multiplexing (COFDM) standards as described in further detail, where the digital television signals are received at an input 103.

Those skilled in the art will perceive that FIG. 1 does not explicitly depict all components within the digital television receiver of the exemplary embodiment. Only so much of the commonly known construction and operation of a digital television receiver and the components therein as are unique to the present invention and/or required for an understanding of the present invention are shown and described herein.

Figure 2:
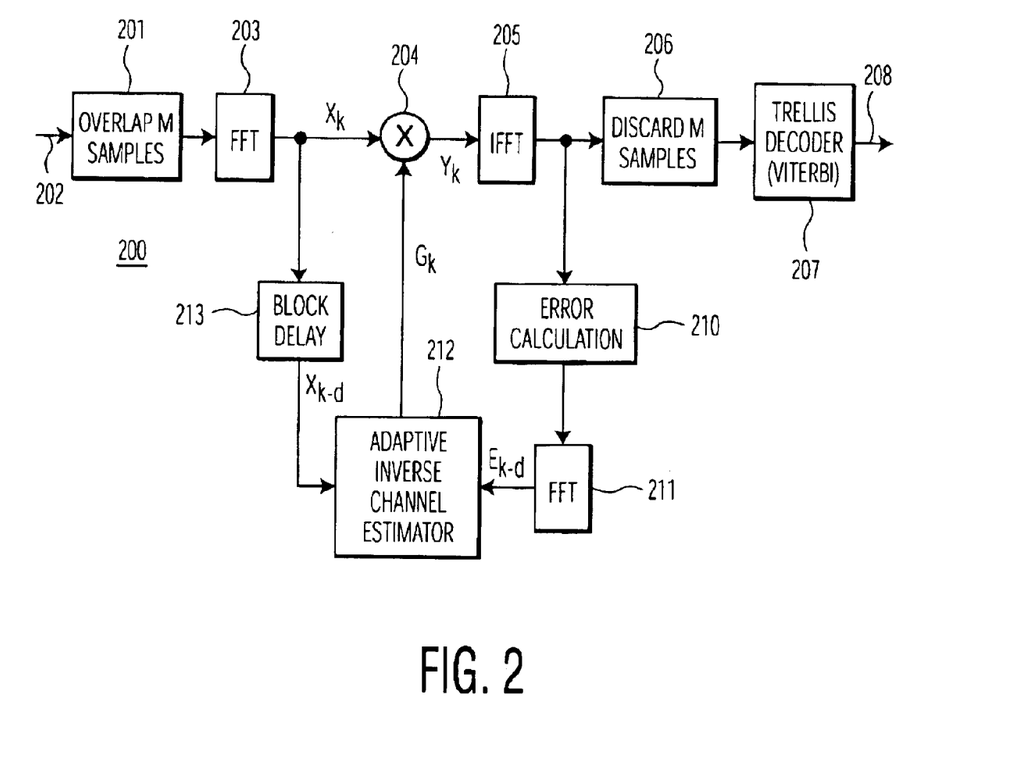
FIG. 2 is a simplified diagram showing, in greater detail, a frequency domain equalizer employing an adaptive inverse channel estimator for use in a multi-standard channel decoder according to one embodiment of the present invention.

FIG. 2 is a simplified diagram showing, in greater detail, a frequency domain equalizer employing an adaptive inverse channel estimator for use in a multi-standard channel decoder according to one embodiment of the present invention. Frequency domain equalizer 200 includes an overlap unit 201 receiving the input signals 202 to be decoded and overlapping M samples to form N samples, where N is the FFT size, which are converted to the frequency domain by FFT unit 203. The output of the FFT unit 203 is modeled as an N×N diagonal matrix $X_k$, where the diagonal elements $\{X_{(n,k)}\}$ of the array $X_k$ are the output of FFT unit 203. The subscript (n,k) refers to the nth frequency bin at the kth FFT block, where n=1, . . . , N.

The output of FFT unit 203 is multiplied by signal multiplier 204 with $G_k$, an N size row vector containing the frequency bins of the inverse channel estimate $\{G_{(n,k)}\}$, to produce $Y_k$, an N size row vector containing the equalized frequency domain output $\{Y_{(n,k)}\}$. The equalized frequency domain output may therefore be described as:

$$Y_k = G_k X_k$$

The frequency domain inverse channel estimate $G_k$ is obtained in the present invention by finding the value of $G_k$ which minimizes a modified version of the time domain recursive least square (RLS) cost function (selected principally to obtain the tracking performance advantage of time domain RLS systems) applied to the frequency domain data:

$$J_k = \sum_{l=0}^{k} \lambda^{k-l} \|E_l\|^2$$

where $E_l$ is the frequency domain error vector defined by $E_l = S_l - G_k X_l$, $S_k$ is an N size row vector containing the frequency domain representation of the transmitted VSB source signal (which is assumed to be known), $\|E\|^2 = EE^H$ (where the superscript $^H$ denotes transposed complex conjugate), and $\lambda$ is a positive constant known as the forgetting factor and having a value constrained by $0 < \lambda < 1$.

The minimum of the cost function $J_k$ is identified by finding the value $G_k$ which satisfies the following partial derivative:

$$\frac{\partial J_k}{\partial G_k} = 0.$$

In order to simplify further analysis, a correlation matrix $R_k$ of the input signal $X_k$ is defined:

$$R_k = \sum_{l=0}^{k} \lambda^{k-l} \|X_l\|^2,$$

together with a cross-correlation vector $P_k$ between the input signal $X_k$ and the desired signal $S_k$:

$$P_k = \sum_{l=0}^{k} \lambda^{k-l} S_l X_l^H.$$

Utilizing these two correlation values within the cost function $J_k$, and after further simplification, the cost function $J_k$ may be expressed as:

$$J_k = \sum_{l=0}^{k} \lambda^{k-l} \|S_l\|^2 + G_k R_k G_k^H - G_k P_k^H - P_k G_k^H. \quad (1)$$

Since $R_k$ is a diagonal matrix and $P_k$ is a vector, the partial differentiation of equation (1) with respect to the elements of $G_k$ yields:

$$\frac{\partial J_k}{\partial G_k^H} = G_k R_k - P_k.$$

The optimum value of $G_k$ is then obtained from the solution of the set of equations $G_k R_k - P_k = 0$, the solution to which yields $$G_k = P_k R_k^{-1}. \quad (2)$$

Because $P_k = \lambda P_{k-1} + S_k X_k^H$, and assuming that $\overline{E_k} = S_k - G_{k-1} X_k$ is a prior estimate of the error $E_k$, the cross-correlation vector $P_k = \lambda P_{k-1} + \overline{E_k} X_k^H + G_{k-1} \|X_k\|^2$ may be written as $$P_k = \lambda (G_{k-1} R_{k-1}) + \overline{E_k} X_k^H + G_{k-1} \|X_k\|^2$$

because $P_{k-1} = G_{k-1} R_{k-1}$. Substitution of this expression for the cross-correlation vector $P_k$ in equation (2), with further simplification, yields $$G_k = G_{k-1} (\lambda R_{k-1} + \|X_k\|^2) R_k^{-1} + \overline{E_k} X_k^H R_k^{-1}. \quad (3)$$

However, where $R_{k-1}$ is initialized with a suitable constant, the correlation matrix $R_k$ may also be described by the following recursive equation:

$$R_k = \lambda R_{k-1} + \|X_k\|^2. \quad (4)$$

Use of this substitution in equation (3), after further simplification, results in $$G_k = G_{k-1} + \overline{E_k} X_k^H R_k^{-1}. \quad (5)$$

The equalized frequency domain output $Y_k$ from signal multiplier 204 is input into IFFT unit 205 for conversion to the time domain. The output of IFFT unit 205 is passed to a discard unit 206, which discards M samples and passes the remaining samples to a trellis decoder (Viterbi) unit 207 which generates the decoded output 208 as well as tentative decisions 209 regarding the error. Error is calculated within error unit 210 in the time domain utilizing the conversion of the equalized frequency domain output $Y_k$ from IFFT unit 205, then converted back into the frequency domain by FFT unit 211. The converted error is then employed by adaptive RLS inverse channel estimator 212 to compute the inverse channel estimate $G_k$.

Depending on the convergence status, error is calculated by error unit 210 utilizing the training sequence, blind algorithms, and/or the tentative decisions 209 from the trellis decoder 207. The above analysis of adaptive inverse channel estimation assumed that the transmitted and error sequences are a priori known, while in practice only the portion of the transmitted sequence is known and the error sequence is not often known. Accordingly, stochastic techniques must be employed to obtain equivalent error. Utilization of other techniques, such as constant modulus algorithm (CMA) and decision directed techniques, to calculate a substitute error may be accommodated by modifying equation (5) to $$G_k = G_{k-1} + \mu E_k X^*_k R_k^{-1} \quad (6)$$

where $\mu$ is a positive constant controlling the adaptation speed and excess mean-square error (MSE).

In the case of VSB, the time distance between successive training sequences (training signals) is so far apart that other techniques must be employed to calculate the error in between training sequences. Depending on the severity of the inter symbol interference (ISI), blind algorithms and decision directed algorithms may be employed to calculate an equivalent error which may be substituted for the actual error.

A block delay unit 213 is also inserted within frequency domain equalizer 200 to reflect the implementation related estimator loop delay (i.e., delay relating to IFFT unit 205, error unit 210 and FFT unit 211). The inverse channel estimate $G_k$ is therefore updated utilizing delayed versions of frequency domain input $X_k$ and error $E_k$ (and correlation matrix $R_k$ employed in calculating error $E_k$.

Figure 3:
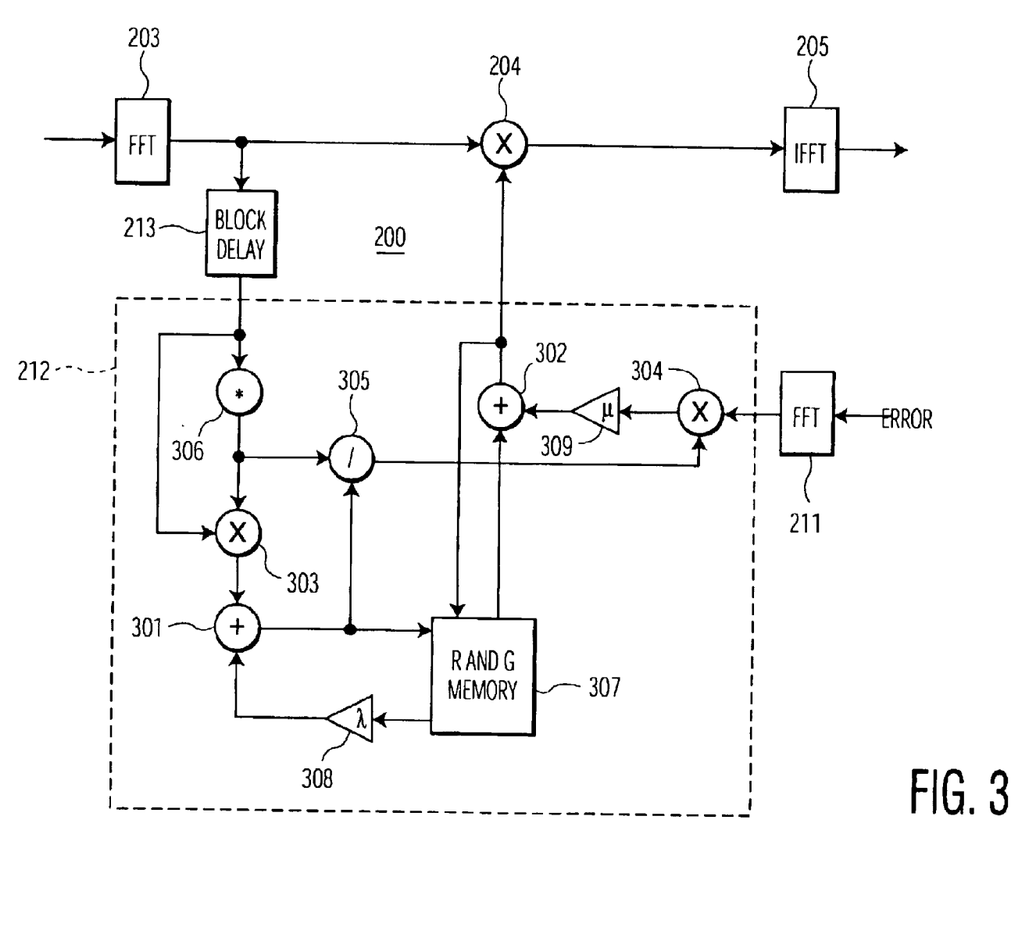
FIG. 3 depicts in greater detail an adaptive inverse channel estimator for a frequency domain equalizer according to one embodiment of the present invention.

FIG. 3 depicts in greater detail an adaptive inverse channel estimator for a frequency domain equalizer according to one embodiment of the present invention. Adaptive inverse channel estimator 212 depicted in FIG. 2 is implemented as shown. Since correlation matrix $R_k$ is a diagonal matrix, the inverse operation involves only inversion of the diagonal elements. Denoting the nth frequency bin within the kth FFT frame as, for example, $G_{n,k}$, where n=1, ... N, the frequency bin update for equations (4) and (6) reduce to $$R_{n,k} = \lambda R_{n,k-1} + \|X_{n,k}\|^2 \quad (7)$$

and $$G_{n,k} = G_{n,k-1} + \mu E_{n,k} X^*_{n,k} R_{n,k}^{-1}, \quad (8)$$

where $R_{n,k}$, $X_{n,k}$, $G_{n,k}$, and $E_{n,k}$ are the diagonal elements of correlation matrix $R_k$, input signal $X_k$, inverse channel estimate $G_k$, and error $E_k$, respectively.

As illustrated in FIG. 3, frequency bin update equations (7) and (8) require a few adders 301 and 302, two complex multipliers 303 and 304, and one complex divider 305. The delayed output $X_{k-d}$ from block delay 213 is passed to signal complex conjugator 306 as well as multiplier 303. Multiplier 303 also receives the output of complex conjugator 306, as does divider 305. The output of multiplier 303, $\|X_{n,k}\|^2$, is added by adder 301 to the previous correlation matrix diagonal element $R_{n,k-1}$ from memory 307 after filtering by $\lambda$ filter 308 to compute current correlation matrix diagonal element $R_{n,k}$.

Correlation matrix diagonal element $R_{n,k}$ is stored in memory 307 and passed to divider 305 to compute $X^*_{n,k} R_{n,k}^{-1}$, which is then passed to multiplier 304 to be multiplied with error diagonal element $E_{n,k}$, with the result being filtered by $\mu$ filter 309 before being passed to adder 302. Adder 302 also receives the previous inverse channel estimate diagonal element $G_{n,k-1}$ from memory 307, and the output of adder 302 is the current inverse channel estimate diagonal element $G_{n,k}$, which is passed to multiplier 204 and stored in memory 307.

The computational resources required for the RLS-based adaptive inverse channel estimator 212 utilizing equations (7) and (8) may be readily mapped onto hardware conventionally employed for existing OFDM algorithms. The values of $\lambda$ and $\mu$, which control the excess MSE and tracking/convergence behavior of the adaptation algorithm (although the correlation matrix $R_k$ is also very useful for convergence and tracking), may be chosen in such a way that multiplication with these values may be implemented with shift and add operations only.

The approximate time domain behavior of the frequency domain equalizer depicted in FIGS. 2 and 3 includes a filtering part approximately equal to an FFT implementation of an FIR filter using cyclic convolution and an updating part equivalent to a block time domain RLS update converging approximately to a Wiener FIR filter solution:

$$G = \frac{H^*}{\|H\|^2 + \sigma},$$

where H is the effective frequency response of the channel and $\sigma$ is the additive white Gaussian noise (AWGN).

Figure 4A:
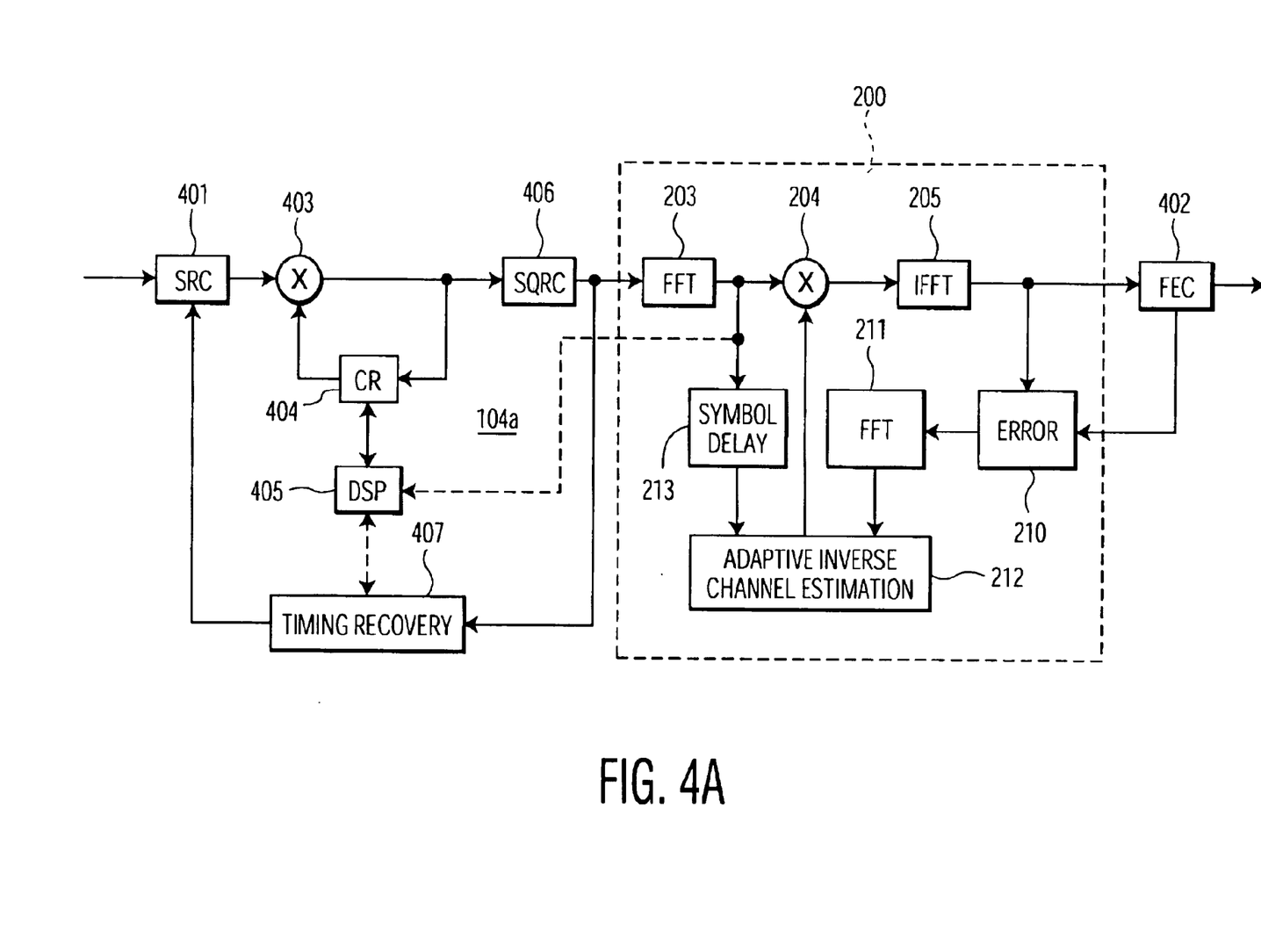
FIGS. 4A and 4B illustrate a multi-standard channel decoder including a frequency domain equalizer employing an adaptive inverse channel estimator according to one embodiment of the present invention.
Figure 4B:
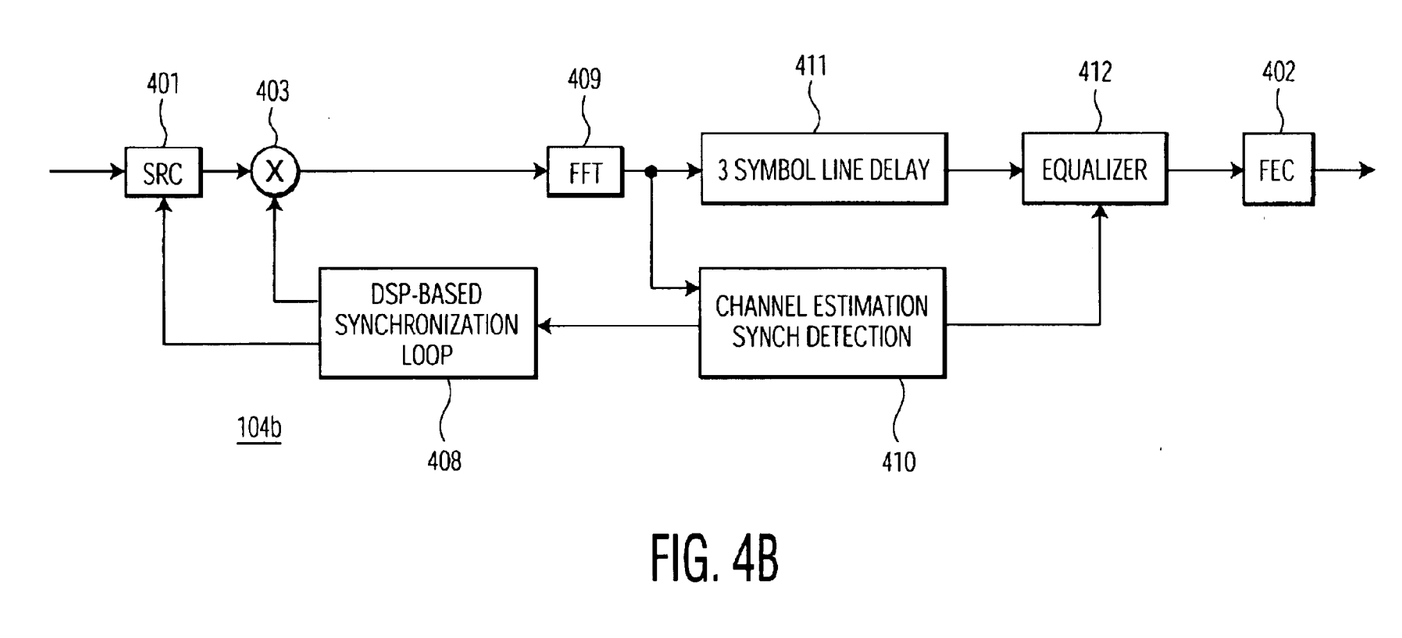

FIGS. 4A and 4B illustrate a multi-standard channel decoder including a frequency domain equalizer employing an adaptive inverse channel estimator according to one embodiment of the present invention. FIG. 4A illustrates the VSB receiver portion of channel decoder 104, which includes a sample rate convert (SRC) unit 401 and a forward error correction (FEC) unit 402. A multiplier 403 receives the output of SRC unit 401 as well as the output of a carrier recovery (CR) unit 404, which operates under the control of a digital signal processor 405 and receives as an input the output of multiplier 403. The output of multiplier 403 is also passed to a square root raised cosine (SQRC) filter unit 406, the output of which is received by frequency domain equalizer 200 and timing recovery unit 407 coupled to SRC unit 401. The output of frequency domain equalizer 200 is passed to FEC unit 402.

FIG. 4B illustrates a coded orthogonal frequency division multiplexer (COFDM) portion of channel decoder 104. SRC unit 401, FEC unit 402 and multiplier 403 are reused for the COFDM decoder. The example shown employs a DSP-based synchronization loop 408 controlling SRC unit 401 and multiplier 403. The output of multiplier 403 is passed to FFT unit 409 for conversion to the frequency domain, from which the frequency domain signals are passed to both channel estimation and synch detection unit 410 and three symbol delay line 411. The outputs of units 410 and 411 are received by an equalizer 412, which is coupled to FEC unit 402. Channel estimation and synch detection unit 410 is also coupled to DSP-based synchronization loop 408.

The frequency domain equalizer 200 within the VSB portion of channel decoder 104 exchanges computationally-intensive time domain equalizer of conventional hardware implementing existing VSB algorithms with a memory intensive equalizer requiring only three FFT operations, a few blocks of memory (each 1K–2K samples) and a few arithmetic operations. The memory requirement of frequency domain equalizer 200 is fully satisfied by available memory within the typical hardware implementation for the existing COFDM algorithm. With the help of a reconfigurable data path unit (not shown), the arithmetic operations may also be mapped onto the COFDM operations, thereby making a complete mapping of the frequency domain equalizer 200 on the COFDM hardware possible with the help of a supporting architecture.

FIGS. 5 through 9 depict simulation results for a frequency domain equalizer employing adaptive inverse channel estimation in accordance with one embodiment of the present invention. Frequency domain equalizer 200 was simulated with a 2K FFT and 1 VSB field (832 segments) per FFT, and compared with simulation results for a time domain decision feedback equalizer (DFE) having 64 forward taps and 256 feedback taps with the center tap located at the middle of the forward equalizer. Both equalizers were started in training mode for one VSB segment (313 samples), then Goddard/trained mode was employed in subsequent fields. A training sequence was implemented for every VSB field (832 samples). Simulations were performed over 1200 segments and symbol error rate (SER) was calculated by the average of the symbol errors of each segment.

Figure 5:
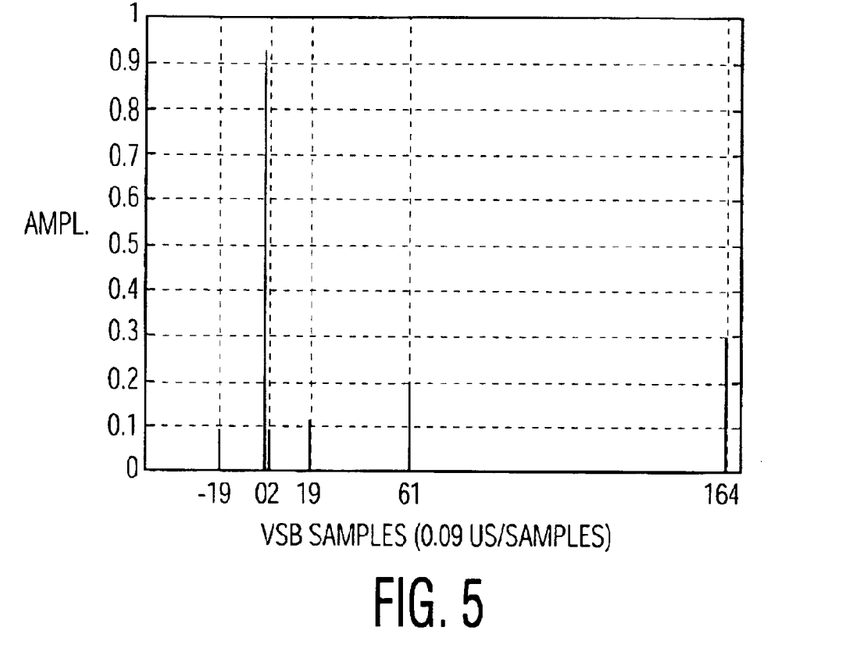
FIGS. 5 through 9 depict simulation results for a frequency domain equalizer employing adaptive inverse channel estimation in accordance with one embodiment of the present invention.
Figure 6:
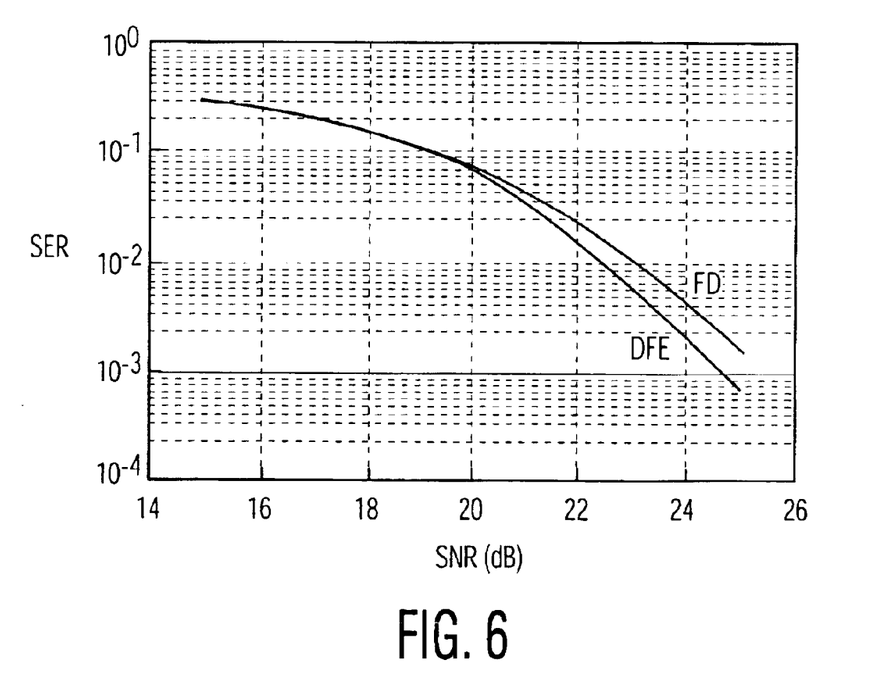
Figure 7:
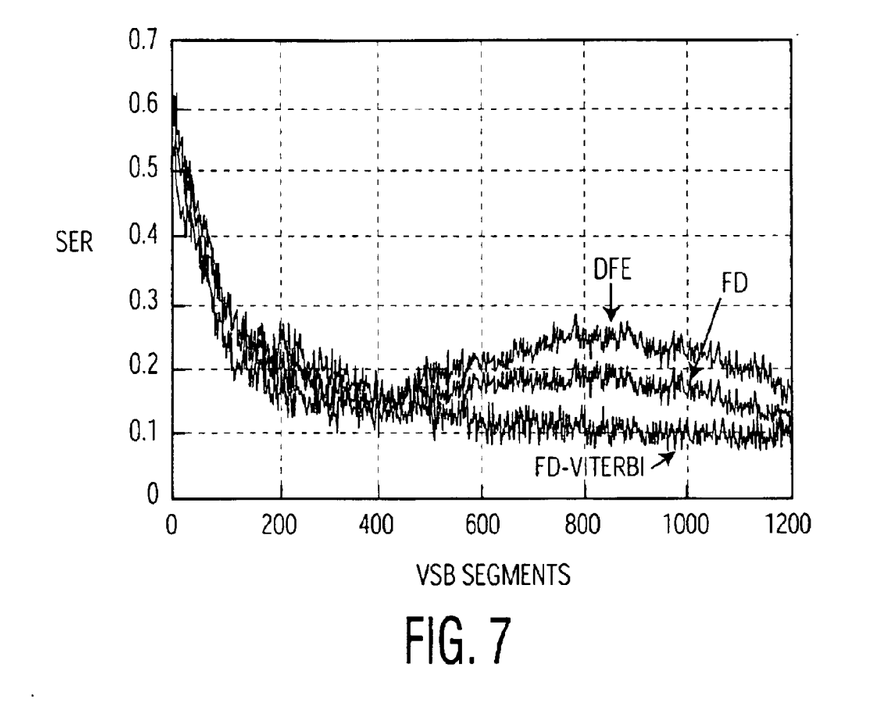

FIG. 5 illustrates the impulse response of the channel employed in the simulations to study static behavior, while FIG. 6 plots the SER curves for the static channel. FIG. 7 shows the SER curves for a dynamic channel in which the 1.8 microsecond ($\mu$s) path was modulated with a sine wave of 5 Hertz (Hz) with a maximum amplitude set 10 decibels (dB) below the main path and a signal-to-noise ratio (SNR) of 20 dB.

Comparing the results of the DFE with the frequency domain equalizer 200 of the present invention in which the error is calculated in either a blind or trained mode, the frequency domain equalizer of the present invention shows a relatively modest performance improvement over the DFE performance. One reason is the relatively rapid tracking of the channel via the RLS adaptive inverse channel estimator. When the error in the frequency domain equalizer is calculated utilizing tentative decisions from a trellis (Viterbi) decoder, the performance improvement is more significant.

Figure 8:
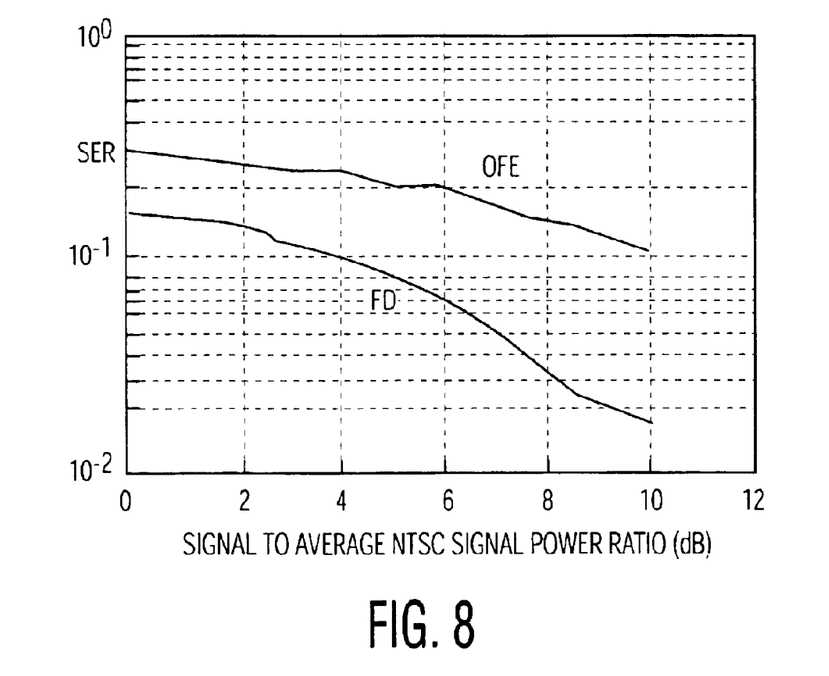

FIG. 8 plots the simulation results when National Television System Committee (NTSC) co-channel interference is added to the VSB signal. The frequency domain equalizer shows better performance, due in part to the long tap behavior of the frequency domain equalizer which makes possible sufficient suppression of the interference signal.

Figure 9:
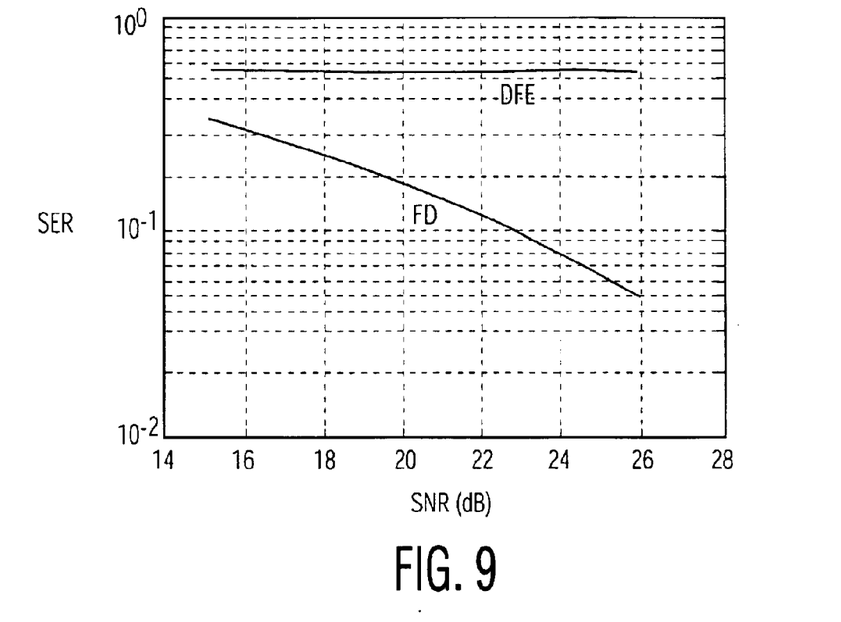

FIG. 9 plots the simulation results for far-end echo, where the DFE performed poorly primarily because the number of taps of the DFE is insufficient to cover the far-end echo. Either the number of taps must be increased or clustering algorithms must be employed to handle such far-end echoes in the time domain equalizer.

The suitability of a frequency domain equalizer for single carrier systems depends upon integrated circuit area cost-effectiveness and multi-path performance compared to a time domain alternative. For a multi-standard demodulator which includes COFDM, the frequency domain equalizer results in a cost-effective solution compared to a time domain equalizer. The frequency domain equalizer of the present invention also exhibited multi-path performance comparable to a practical decision feedback equalizer and even, in some cases such as dynamic and multi-path, co-channel interference and far-end echo, most to high performance advantages. Other potential advantages include flexibility in handling pre-cursor paths and possible improvement of carrier/timing recovery utilizing the frequency domain representation.

While optimal hardware sharing of COFDM and VSB is a main motivation for considering a frequency domain equalizer for a single carrier system, other advantages may also exist in utilizing such configurations. Since most of the equalizer operations are memory intensive, additional equalizer operations may also be implemented on the COFDM hardware without significant additional hardware overhead. Such additional operations include diversity reception utilizing a dual adaptive linear filter, complex/real mode of operation and dual channel single-carrier (e.g., quadrature amplitude modulated and vestigial sideband) demodulation. Scalable channel decoding algorithms which utilize the existing COFDM resources with minimal additional hardware overhead are more attractive.

Although the present invention has been described in detail, those skilled in the art will understand that various changes, substitutions and alterations herein may be made without departing from the spirit and scope of the invention in its broadest form.

What is claimed is:

1. For use in a single integrated circuit multi-standard demodulator, a frequency domain equalizer for demodulation of a single carrier signal comprising:
    a signal multiplier producing an equalized output from a frequency domain input and a frequency domain inverse channel estimate; and
    an adaptive inverse channel estimator calculating said frequency domain inverse channel estimate utilizing a least square cost function; wherein said adaptive inverse channel estimator calculates said frequency domain inverse channel estimate utilizing a diagonal correlation matrix to shift from a computational intensive to a memory-intensive implementation.

2. The frequency domain equalizer as set forth in claim 1 wherein said adaptive inverse channel estimator employs a memory, a forgetting factor employed to calculate a current diagonal element within said diagonal correlation matrix from a previous diagonal element within said diagonal correlation matrix, and an adaptation and error control constant employed to alter a previous inverse channel estimate matrix element to derive a current inverse channel estimate matrix element, wherein values for said forgetting factor and said adaptation and error control constant are selected such that multiplication by either said forgetting factor or said adaptation and error control constant may be implemented by shift and add operations.

3. The frequency domain equalizer as set forth in claim 2 wherein said adaptive inverse channel estimator further comprises:
    a complex conjugator receiving a delayed input signal;
    a signal multiplier receiving both said delayed input signal and an output of said complex conjugator;
    a signal adder receiving an output of said signal multiplier and said previous diagonal element within said diagonal correlation matrix multiplied by said forgetting factor, a output of said signal adder comprising said current diagonal element within said diagonal correlation matrix.

4. The frequency domain equalizer as set forth in claim 3 wherein said adaptive inverse channel estimator further comprises:
    a signal divider receiving said output of said complex conjugator and said output of said signal adder;
    a second signal multiplier receiving an output of said signal divider and a frequency domain error estimate; and
    a second signal adder receiving an output of said second signal multiplier multiplied by said adaptation and error control constant and said previous inverse channel estimate matrix element, an output of said second signal adder comprising said current inverse channel estimate matrix element.

5. A single integrated circuit multi-standard demodulator comprising:
    a first decoder selectively demodulating a multi-carrier signal; and
    a second decoder selectively demodulating a single carrier signal, said second decoder including a frequency domain equalizer equalizer utilizing hardware employed for said first decoder and comprising:
        a signal multiplier producing an equalized output from a frequency domain input and a frequency domain inverse channel estimate; and
        an adaptive inverse channel estimator calculating said frequency domain inverse channel estimate utilizing a least square cost function.

6. The demodulator as set forth in claim 5 wherein said adaptive inverse channel estimator calculates said frequency domain inverse channel estimate utilizing a diagonal correlation matrix.

7. The demodulator as set forth in claim 6 wherein said adaptive inverse channel estimator employs a memory, a forgetting factor employed to calculate a current diagonal element within said diagonal correlation matrix from a previous diagonal element within said diagonal correlation matrix, and an adaptation and error control constant employed to alter a previous inverse channel estimate matrix element to derive a current inverse channel estimate matrix element, wherein values for said forgetting factor and said adaptation and error control constant are selected such that multiplication by either said forgetting factor or said adaptation and error control constant may be implemented by shift and add operations.

8. The demodulator as set forth in claim 7 wherein said adaptive inverse channel estimator further comprises:
    a complex conjugator receiving a delayed input signal;
    a signal multiplier receiving both said delayed input signal and an output of said complex conjugator;
    a signal adder receiving an output of said signal multiplier and said previous diagonal element within said diagonal correlation matrix multiplied by said forgetting factor, a output of said signal adder comprising said current diagonal element within said diagonal correlation matrix.

9. The demodulator as set forth in claim 8 wherein said adaptive inverse channel estimator further comprises:
- a signal divider receiving said output of said complex conjugator and said output of said signal adder;
- a second signal multiplier receiving an output of said signal divider and a frequency domain error estimate; and
- a second signal adder receiving an output of said second signal multiplier multiplied by said adaptation and error control constant and said previous inverse channel estimate matrix element, an output of said second signal adder comprising said current inverse channel estimate matrix element.

10. For use in a frequency domain equalizer, a method of adaptive inverse channel estimation comprising:
- multiplying a frequency domain input from a single carrier and a frequency domain inverse channel estimate to produce an equalized output; and
- calculating the frequency domain inverse channel estimate utilizing a least square cost function estimate utilizing a least square cost function by calculating the frequency domain inverse channel estimate utilizing a diagonal correlation matrix to shift from a computational intensive to a memory intensive implementation.

11. The method as set forth in claim 10 wherein the step of calculating the frequency domain inverse channel estimate utilizing a least square cost function further comprises:
- storing a previous diagonal element within the diagonal correlation matrix and a previous inverse channel estimate matrix element within a memory;
- employing a forgetting factor to calculate a current diagonal element within the diagonal correlation matrix from the previous diagonal element within the diagonal correlation matrix; and
- employing an adaptation and error control constant to alter the previous inverse channel estimate matrix element and derive a current inverse channel estimate matrix element,
- wherein values for the forgetting factor and the adaptation and error control constant are selected such that multiplication by either the forgetting factor or the adaptation and error control constant may be implemented by shift and add operations.

12. The method as set forth in claim 11 wherein the step of calculating the frequency domain inverse channel estimate utilizing a least square cost function further comprises:
- computing a complex conjugate of a delayed input signal;
- multiplying the delayed input signal with the complex conjugate; and
- adding a result of multiplying the delayed input signal with the complex conjugate to the previous diagonal element within the diagonal correlation matrix multiplied by the forgetting factor to produce the current diagonal element within the diagonal correlation matrix.

13. The method as set forth in claim 12 wherein the step of calculating the frequency domain inverse channel estimate utilizing a least square cost function further comprises:
- dividing the complex conjugate by the current diagonal element within the diagonal correlation matrix;
- multiplying a result of dividing the complex conjugate by the current diagonal element within the diagonal correlation matrix with a frequency domain error estimate and the adaptation and error control constant; and
- adding the previous inverse channel estimate matrix element to a result of multiplying the result of dividing the complex conjugate by the current diagonal element within the diagonal correlation matrix with a frequency domain error estimate and the adaptation and error control constant to produce the current inverse channel estimate matrix element.

14. A single integrated circuit multi-standard demodulator comprising:
- an OFDM decoder; and
- a VSB decoder, said VSB decoder including a frequency domain equalizer comprising:
  - a signal multiplier producing an equalized output from a frequency domain input and a frequency domain inverse channel estimate; and
  - an adaptive inverse channel estimator calculating said frequency domain inverse channel estimate utilizing a least square cost function,
wherein said frequency domain equalizer utilizes hardware employed for said OFDM decoder.

15. The demodulator as set forth in claim 14 wherein said adaptive inverse channel estimator calculates said frequency domain inverse channel estimate utilizing:
- a diagonal correlation matrix;
- a forgetting factor in calculating a current diagonal element within said diagonal correlation matrix from a previous diagonal element within said diagonal correlation matrix;
- an adaptation and error control constant in altering a previous inverse channel estimate matrix element to derive a current inverse channel estimate matrix element,
- wherein values for said forgetting factor and said adaptation and error control constant are selected such that multiplication by either said forgetting factor or said adaptation and error control constant may be implemented by shift and add operations within said hardware employed for said OFDM decoder.

16. The demodulator as set forth in claim 15 wherein said adaptive inverse channel estimator employs a memory within said hardware employed for said OFDM decoder to store said previous diagonal element for said diagonal correlation matrix and said previous inverse channel estimate matrix element.

17. The demodulator as set forth in claim 16 wherein said adaptive inverse channel estimator further comprises:
- a complex conjugator receiving a delayed input signal;
- a signal multiplier receiving both said delayed input signal and an output of said complex conjugator;
- a signal adder receiving an output of said signal multiplier and said previous diagonal element within said diagonal correlation matrix multiplied by said forgetting factor, a output of said signal adder comprising said current diagonal element within said diagonal correlation matrix.

18. The demodulator as set forth in claim 17 wherein said adaptive inverse channel estimator further comprises:
- a signal divider receiving said output of said complex conjugator and said output of said signal adder;
- a second signal multiplier receiving an output of said signal divider and a frequency domain error estimate; and
- a second signal adder receiving an output of said second signal multiplier multiplied by said adaptation and error control constant and said previous inverse channel estimate matrix element, an output of said second signal adder comprising said current inverse channel estimate matrix element.

* * * * *